May 11, 1965 JUNICHI YASUDA ETAL 3,183,407

COMBINED ELECTRICAL ELEMENT

Original Filed July 3, 1961

Inventors
Junichi Yasuda
Yasuharu Kubota by Hill, Sherman, Meroni, Gross & Simpson Attnys.

United States Patent Office 3,183,407

Patented May 11, 1965

3,183,407

COMBINED ELECTRICAL ELEMENT

Junichi Yasuda, Tokyo, and Yasuharu Kubota, Ichikawa-shi, Chiba-ken, Japan, assignors to Sony Corporation, Tokyo, Japan, a corporation of Japan Continuation of application Ser. No. 121,551, July 3, 1961. This application Oct. 4, 1963, Ser. No. 314,841
6 Claims. (Cl. 317—101)

This invention relates to a combined electrical element, and more specifically, to a combined electrical element which includes a tunnel diode as one of the elements.

A tunnel diode (also known as an Esaki diode) has a negative resistance characteristic and is often employed in oscillators or amplifiers where it is combined with elements such as by-pass capacitors or backward diodes for achieving certain characteristics. In these cases, the lead wires, connecting the tunnel diode with the other elements may cause inductive reaction, particularly at high frequencies, which could have an undesirable effect on the oscillator or amplifier in which the tunnel diode is included. The same is true of other diodes, besides the tunnel diode.

An object of the invention is to provide a combined electrical element in which a diode and other electrical elements are combined into a unitary structure without using any connecting lead wires, so as to eliminate the inductance caused by such lead wires.

Another object of the invention is to provide a combined electrical element which is simple in construction and small in size, and which is applicable to circuits including tunnel diodes and other electrical elements.

Other objects, features and advantages of this invention will be fully apparent from the following description taken in connection with the accompanying drawings in which.

Figure 1:
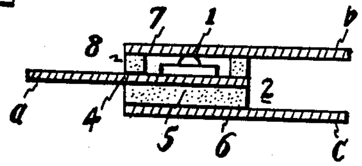
FIGURE 1 is an enlarged cross-sectional view of a combined electrical element employing a tunnel diode and a by-pass capacitor.

The specific embodiments of the invention shown in the drawings will be made in conjunction with the employment of a tunnel diode. In FIGURE 1, for example, a tunnel diode 1 is mounted on a flat, conductive strip support 4 either by a physical contact alone or by welding. As indicated, the end of the conductor strip support 4 extends well beyond the diode 1 to form a terminal "*a*." A conductive strip 7 is in electrical contact with the other electrode of the tunnel diode 1 for instance the "dot" portion, and has an extending end portion "*b*" forming another terminal of the assembly. An insulating ring 8 composed of a ceramic material or the like surrounds the diode 1 and is disposed between the conductive plates 4 and 7, keeping the plates in spaced apart relationship.

Figure 2:
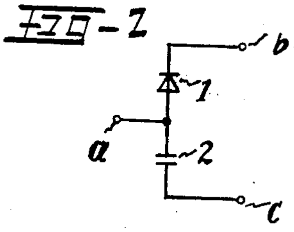
FIGURE 2 is the equivalent circuit diagram of the structure of FIGURE 1.

Another conductive plate or strip 6 is provided below the strip 4 and confines a dielectric layer 5 between it and the bottom surface of the conductive support strip 4. The conductive strip 6 has an extending end portion "*c*" providing a third terminal for the assembly. Thus, a capacitor 2 is formed between the conductive strips 4 and 6 having terminals "*a*" and "*c*." The entire assembly consists of a combined electrical element having one terminal "*b*" of diode 1, a terminal "*c*" of the capacitor 2, and a common terminal "*a*" between the two, as illustrated in the circuit diagram of FIGURE 2.

Figure 3:
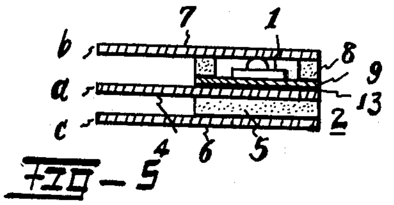
FIGURE 3 is an enlarged cross-sectional view of another combined electrical element produced according to this invention.
Figure 4:
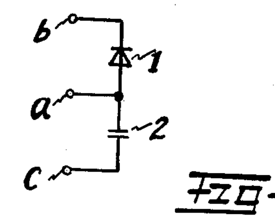
FIGURE 4 is the equivalent circuit diagram of the structure of FIGURE 3.

In FIGURE 3, there is illustrated an electrode plate 9 having a tunnel diode 1 previously mounted thereon, the plate 9 being attached to a conductive support strip 4 by means of a conductive adhesive layer 13. A conductive strip 7 contacts the dot of the tunnel diode 1 in the same manner as the embodiment shown in FIGURE 1. Similarly, a dielectric layer 5 is placed on a conductive strip 6 which is then secured to the conductive support plate 4. An insulating ring 8 is disposed between the electrode plate 9 and the conductive strip 7. FIGURE 4 illustrates the equivalent electrical circuit provided by the tunnel diode 1, the capacitor 2, and the three terminals "*a*," "*b*," and "*c*" formed from the end portions of the conductive strips 4, 6 and 7.

Figure 5:
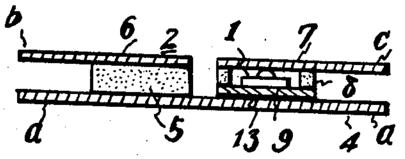
FIGURE 5 is an enlarged cross-sectional view of another modified form of a combined electrical element of this invention.
Figure 6:
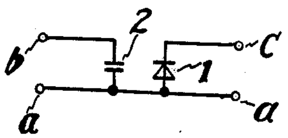
FIGURE 6 is the equivalent circuit diagram of the structure of FIGURE 5.

In the assembly shown in FIGURE 5, the tunnel diode 1 is mounted on an electrode plate 9 which, in turn, is attached to a conductive support plate 4 by means of an electrically conductive adhesive 13. The other electrode of the tunnel diode 1 is in electrical contact with the conductive plate 7. The conductive support plate 4 has an extension providing an electrical terminal "*a*," and the conductive strip 7 has an extension providing the electrical terminal "*c*." A dielectric layer 5 is disposed between the conductive support plate 4 and another conductive strip 6 and united thereto. Thus, the tunnel diode 1 and the capacitor 2 are mechanically supported in spaced relation on a common conductive support member 4. The equivalent circuit of the combined element is shown in FIGURE 6 from which it will be seen that the assembly provides a pair of common terminals "*a*" and "*a*," and terminals "*b*" and "*c*" running to the capacitor 2 and the diode 1, respectively.

Figure 7:
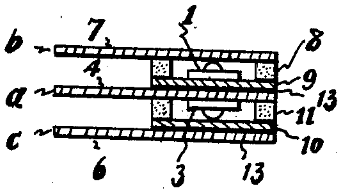
FIGURE 7 is an enlarged sectional view of a combined electrical element employing a tunnel diode and a backward diode.
Figure 8:
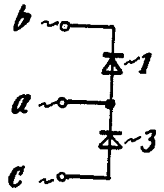
FIGURE 8 is the equivalent circuit diagram of the structure of FIGURE 7.

The assembly of FIGURE 7 includes a tunnel diode 1 mounted on an electrode plate 9, the latter being joined to the conductive support plate 4 by means of an electrically conductive adhesive 13. One electrode of a backward diode 3 is electrically connected to the conductive support plate 4. The other electrode of the backward diode 3 is supported on an electrode plate 10 which is secured to a conductive plate 6 by means of an electrically conductive adhesive 13. An insulating ring 11 is interposed between the electrode plate 10 and the conductive support plate 4. The equivalent circuit of the two diodes is illustrated in FIGURE 8, illustrating the common terminal "*a*" and the terminals "*b*" and "*c*" extending to the opposite ends of the two diodes in series.

Figure 9:
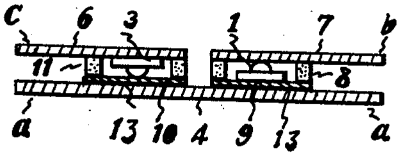
FIGURE 9 is an enlarged cross-sectional view of another combined electrical element employing a tunnel diode and a backward diode.

FIGURE 9 shows an example wherein a tunnel diode 1 and a backward diode 3 are supported on a common conductive plate 4 similarly to the embodiment shown in FIGURE 5. The diode 1 is mounted on an electrode plate 9 which in turn is secured to the common supporting strip 4 by means of an electrically conductive adhesive 13. A conducting strip 7 contacts the other electrode of the diode 1, and an insulating ring 8 is interposed between the conductive strip 7 and the electrode plate 9.

Figure 10:
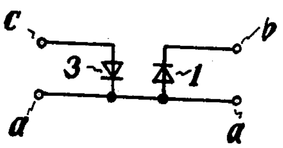
FIGURE 10 is the equivalent circuit diagram of the structure of FIGURE 9.

The backward diode 3 has one electrode in contact with an electrically conducting strip 6 and its other electrode in contact with an electrode plate 10 which is secured to the common support strip 4 by means of an electrically conductive adhesive 13. An insulating ring 11 is disposed between the strip 6 and the conductive plate 13 in the same manner as in the other embodiments. The corresponding equivalent circuit is shown in FIGURE 10 of the drawings.

As illustrated in the foregoing embodiments, a capacitor may be combined with a diode, and electrically connected thereto without any connecting lead wires. This provides the great advantage of eliminating undesirable influence of inductance and capacitance due to leads, and further has the advantage that the elements may be formed in small size.

While the invention has been described in connection with certain embodiments, other modifications can be made when required for various purposes. For example, in FIGURE 5, it is possible to integrate the conductive strips 6 and 7 and attach another dielectric layer to the common support strip 4 in order to add a capacitor to the assembly.

It will be evident that various modifications and variations may be affected without departing from the scope of the novel concepts of the present invention.

We claim as our invention:

1. A combined electrical element comprising a conductive strip support having a flat longitudinal surface, a semi-conductor diode situated adjacent said surface of said strip support and having one of its electrodes in electrical contact with said strip support, a first conductive strip in electrical contact with the other electrode of said diode and in spaced apart relation to said strip support, insulating means disposed between said first conductor strip and said strip support to maintain said spaced apart relation therebetween, an electric circuit element situated adjacent said surface of said strip support and in longitudinally spaced relation with said semiconductor diode relative to said strip support with one of its electrodes in electrical contact with said strip support and a second conductive strip secured to the other electrode of said electric circuit element and in spaced apart relation to said strip support.

2. A combined electrical element comprising a conductive strip support having a flat longitudinal surface, a pair of semi-conductor diodes situated adjacent said surface of said strip support and in spaced relation with each other longitudinally on said surface, each of said diodes having one of its electrodes in electrical contact with said strip support, first and second conductive strips situated adjacent said surface of said strip support in mutually longitudinally spaced apart relation and in overlying relation respective with said diodes, each of said diodes having the other of its electrodes in electric contact with said strip support, and first and second insulating means interposed respectively between said first and second conductive strips and said strip support for maintaining said conductive strips and said strip support in spaced apart relation.

3. A combined electrical element comprising a conductive strip support having a flat longitudinal surface, a semi-conductor diode situated adjacent said surface of said strip support and having one of its electrodes in electrical contact with said strip support, a first conductive strip in electrical contact with the other electrode of said diode and in spaced apart relation to said strip support, insulating means disposed between said first conductive strip and said strip support to maintain said spaced apart relation therebetween, a capacitor having one surface disposed on said longitudinal surface of said strip support in longitudinally spaced relation to said diode, and a second conductive strip engaging the opposite surface of said capacitor and extending in spaced apart relation to said strip support.

4. A combined electrical element comprising a conductive strip support having a flat longitudinal surface, a semi-conductor diode situated adjacent said surface of said strip support, an electrically conductive adhesive interposed between one electrode of said diode and said strip support, a first conductive strip in electrical contact with the other electrode of said diode and in spaced apart relation to said strip support, insulating means disposed between said first conductive strip and said strip support to maintain said spaced apart relation therebetween, an electric circuit element situated adjacent said surface of said strip support and in longitudinally spaced relation with said semi-conductor diode relative to said strip support with one of its electrodes in electrical contact with said strip support and a second conductive strip secured to the other electrode of said electric circuit element and in spaced apart relation to said strip support.

5. A combined electrical element comprising a conductive strip support having a flat longitudinal surface, a pair of semi-conductor diodes situated adjacent said surface of said strip support and in spaced relation with each other longitudinally on said surface, an electrically conductive adhesive interposed between one electrode of each of said diodes and said strip support, first and second conductive strips situated adjacent said surface of said strip support in mutually longitudinally spaced apart relation and in overlying relation respectively with said diodes, each of said diodes having the other electrodes in electric contact with said first and second conductive strips, respectively, and first and second insulating means interposed respectively between said first and second conductive strips and said strip support for maintaining said conductive strips and said strip support in spaced apart relation.

6. A combined electrical element comprising a conductive strip support having a flat longitudinal surface, a semi-conductive diode situated adjacent said surface of said strip support, an electrically conductive adhesive interposed between one electrode of said diode and said strip support, a first conductive strip in electrical contact with the other electrode of said diode and in spaced apart relation to said strip support, insulating means disposed between said first conductive strip and said strip support to maintain said spaced apart relation therebetween, a capacitor having one surface disposed on said longitudinal surface of said strip support in longitudinally spaced relation to said diode, and a second conductive strip engaging the opposite surface of said capacitor and extending in spaced apart relation to said strip support.

No references cited.

JOHN F. BURNS, *Primary Examiner.*